United States Patent Office 3,448,932
Patented June 10, 1969

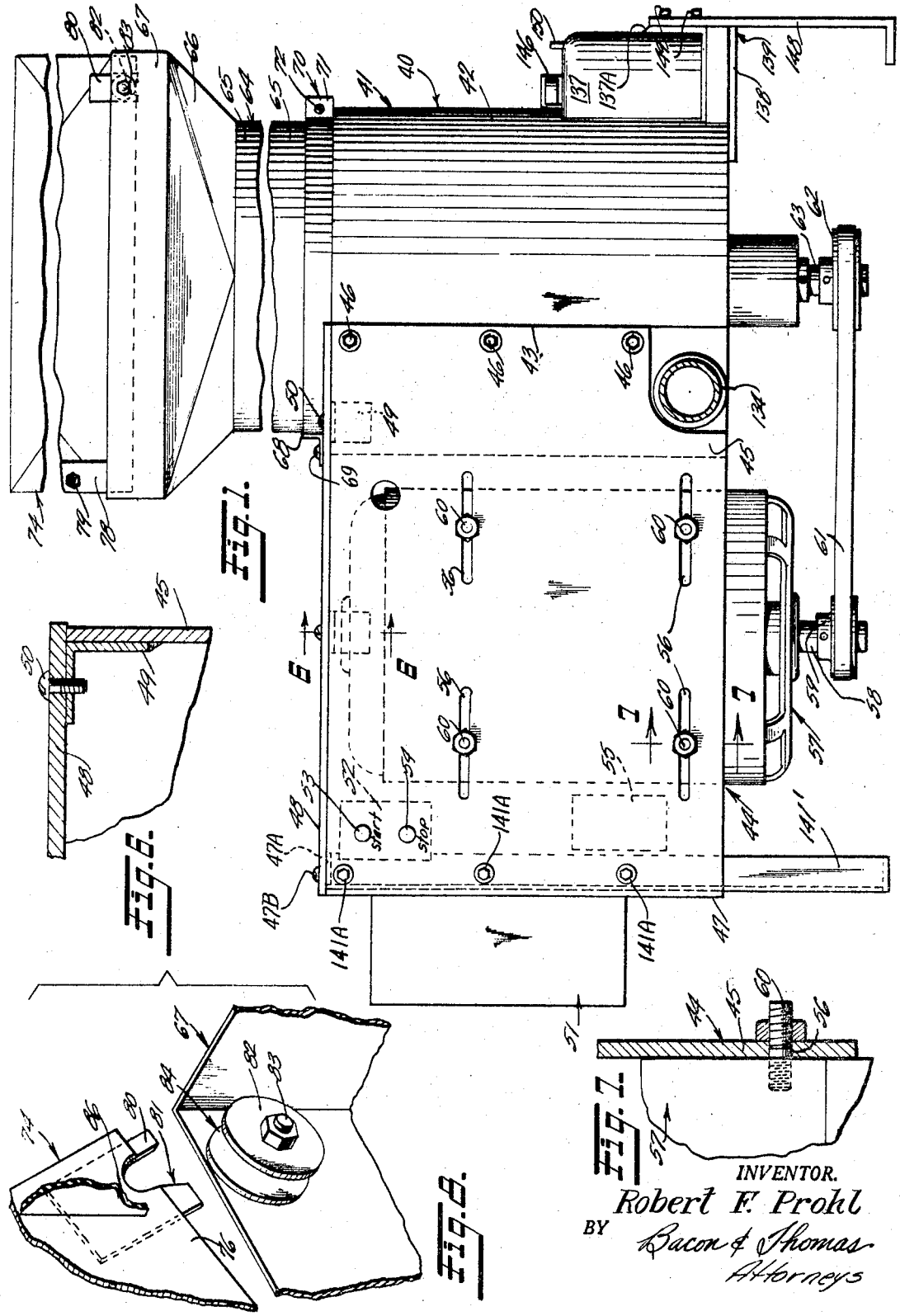

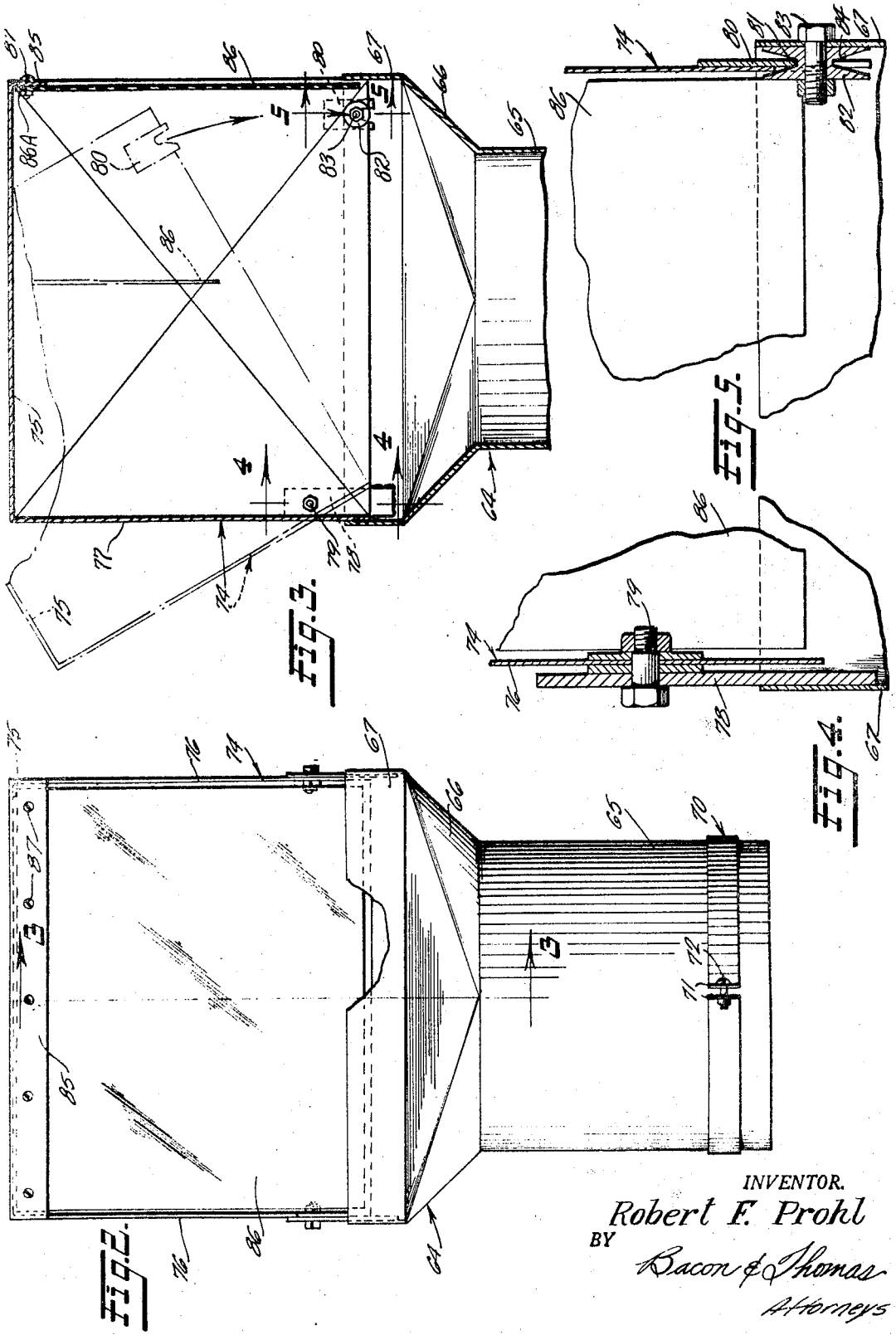

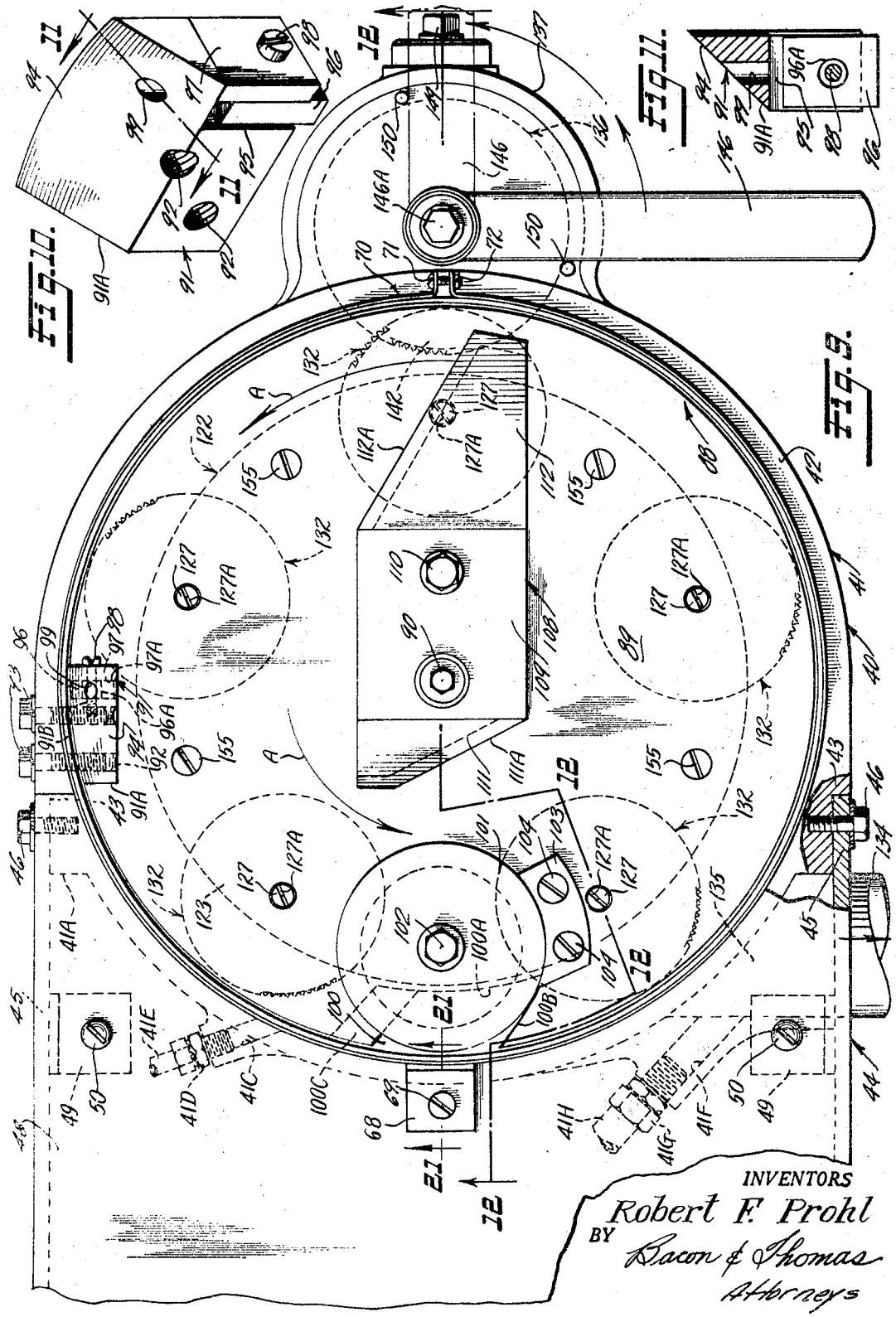

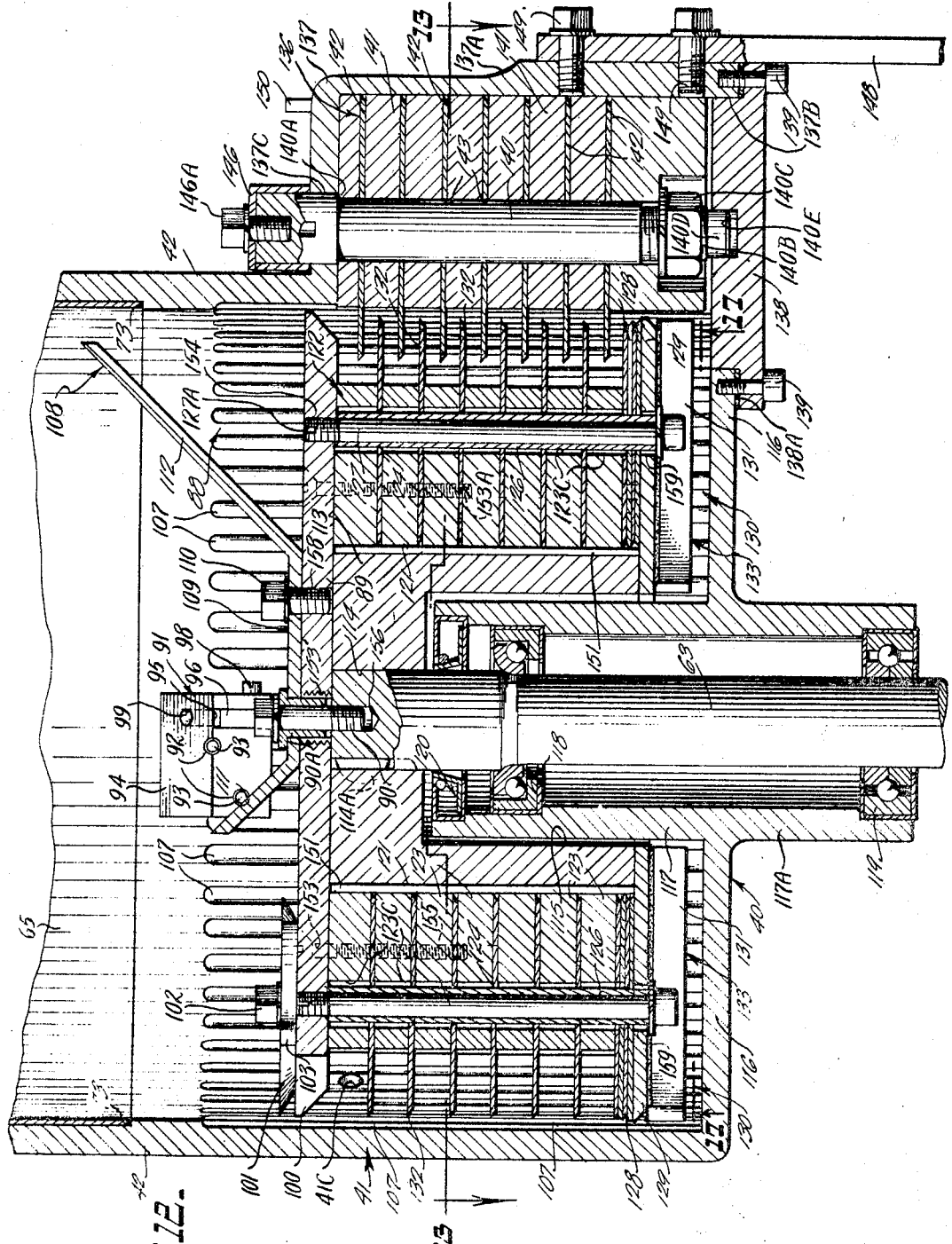

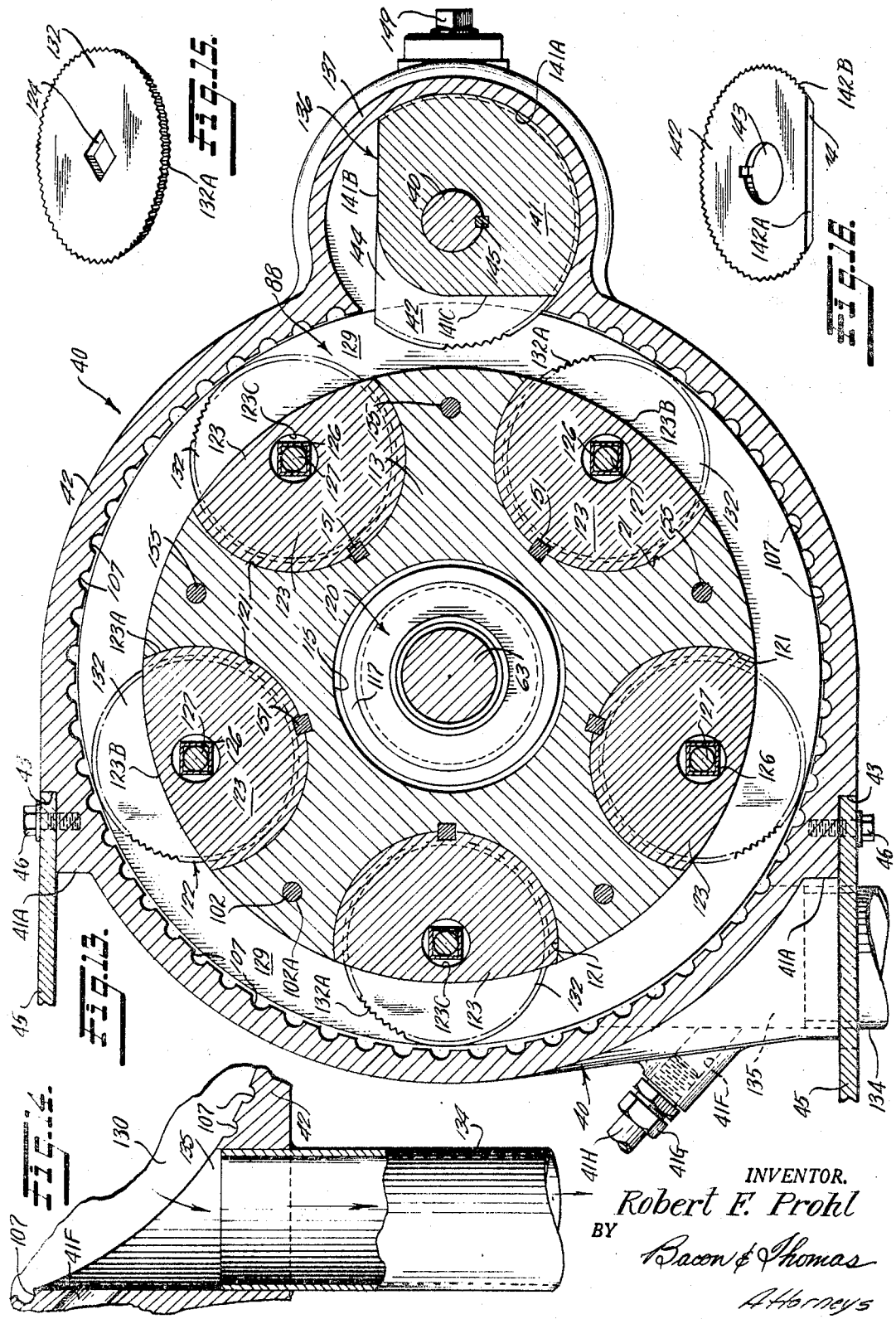

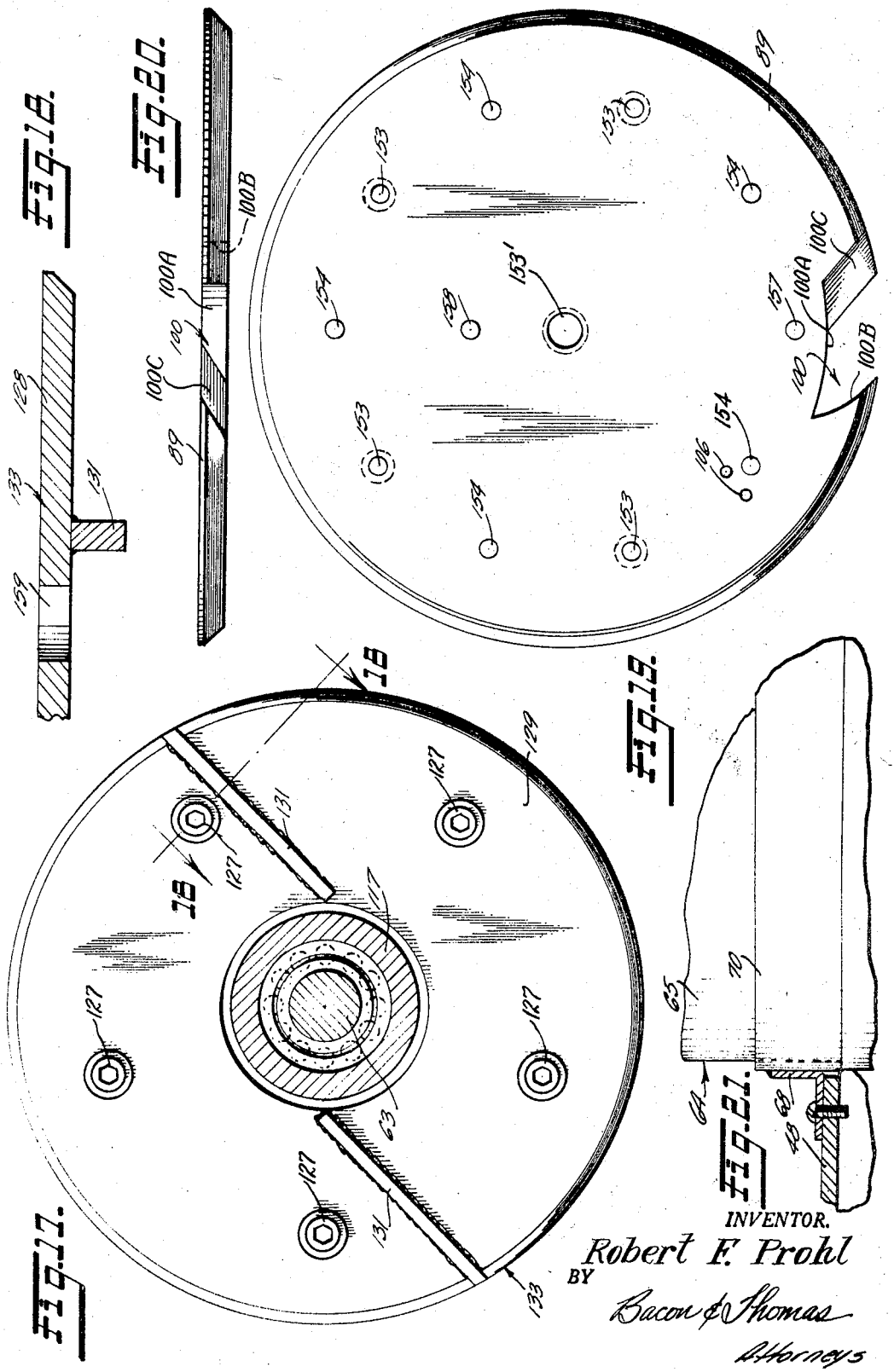

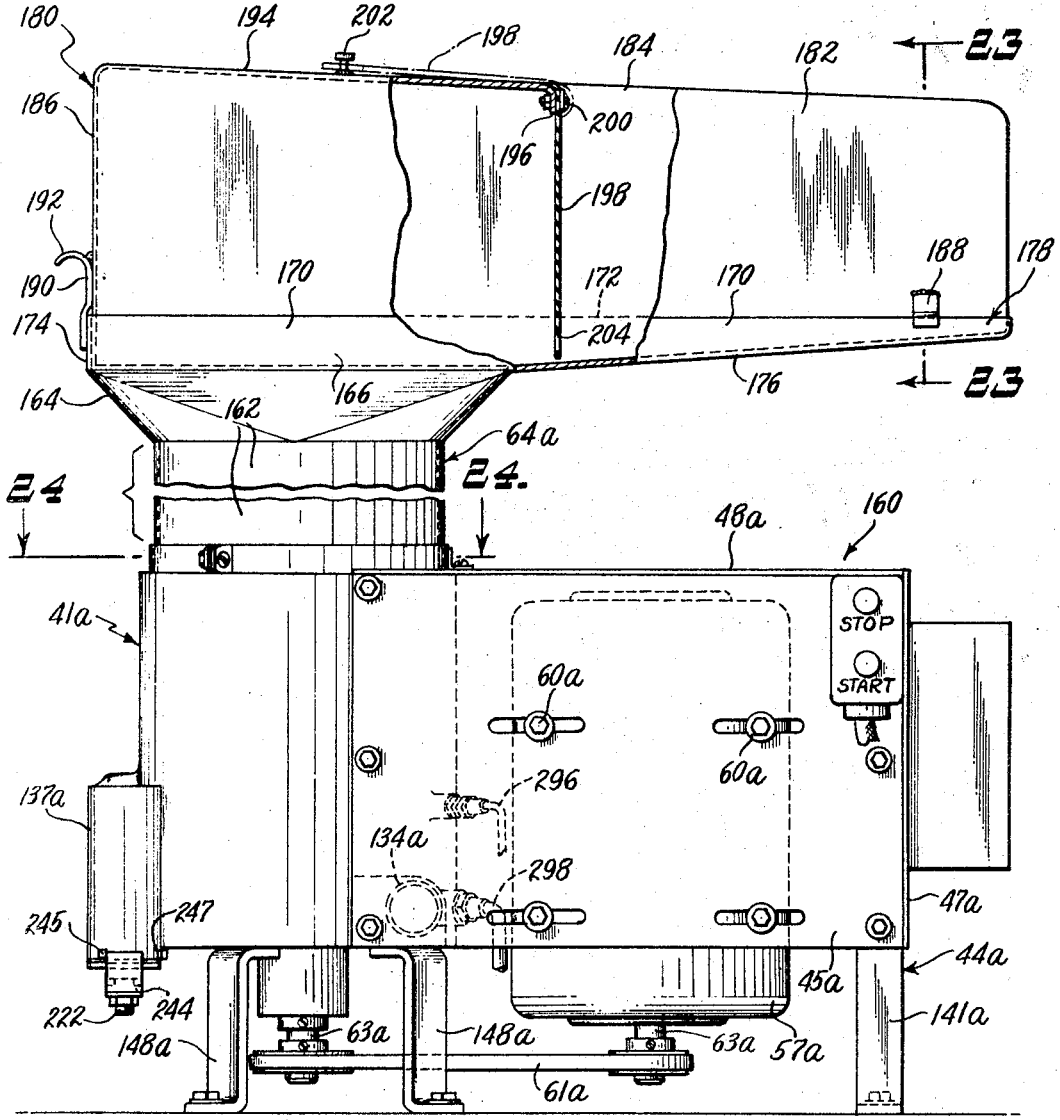
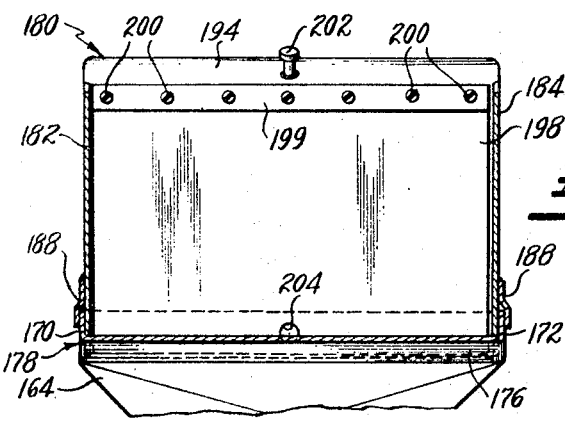

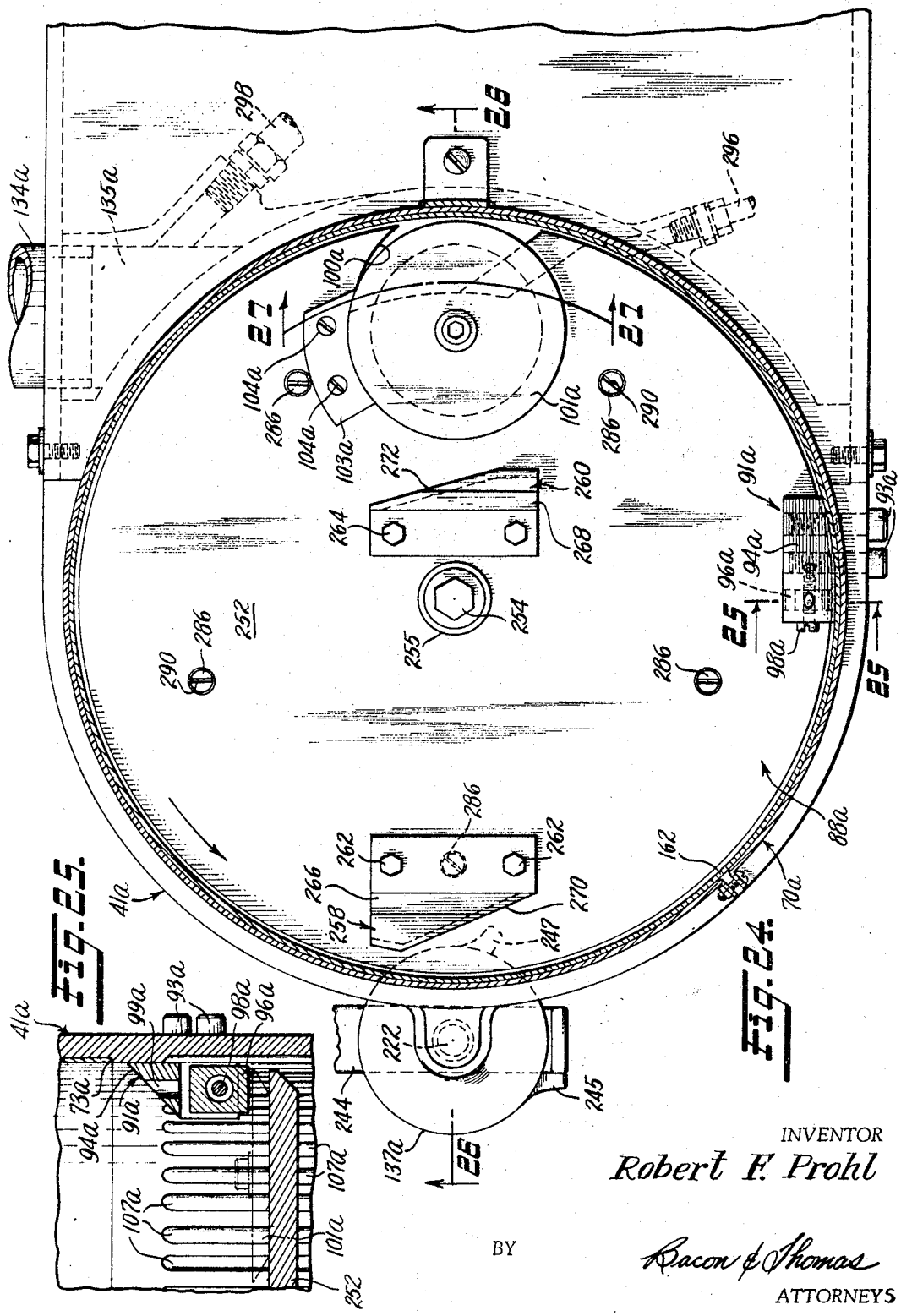

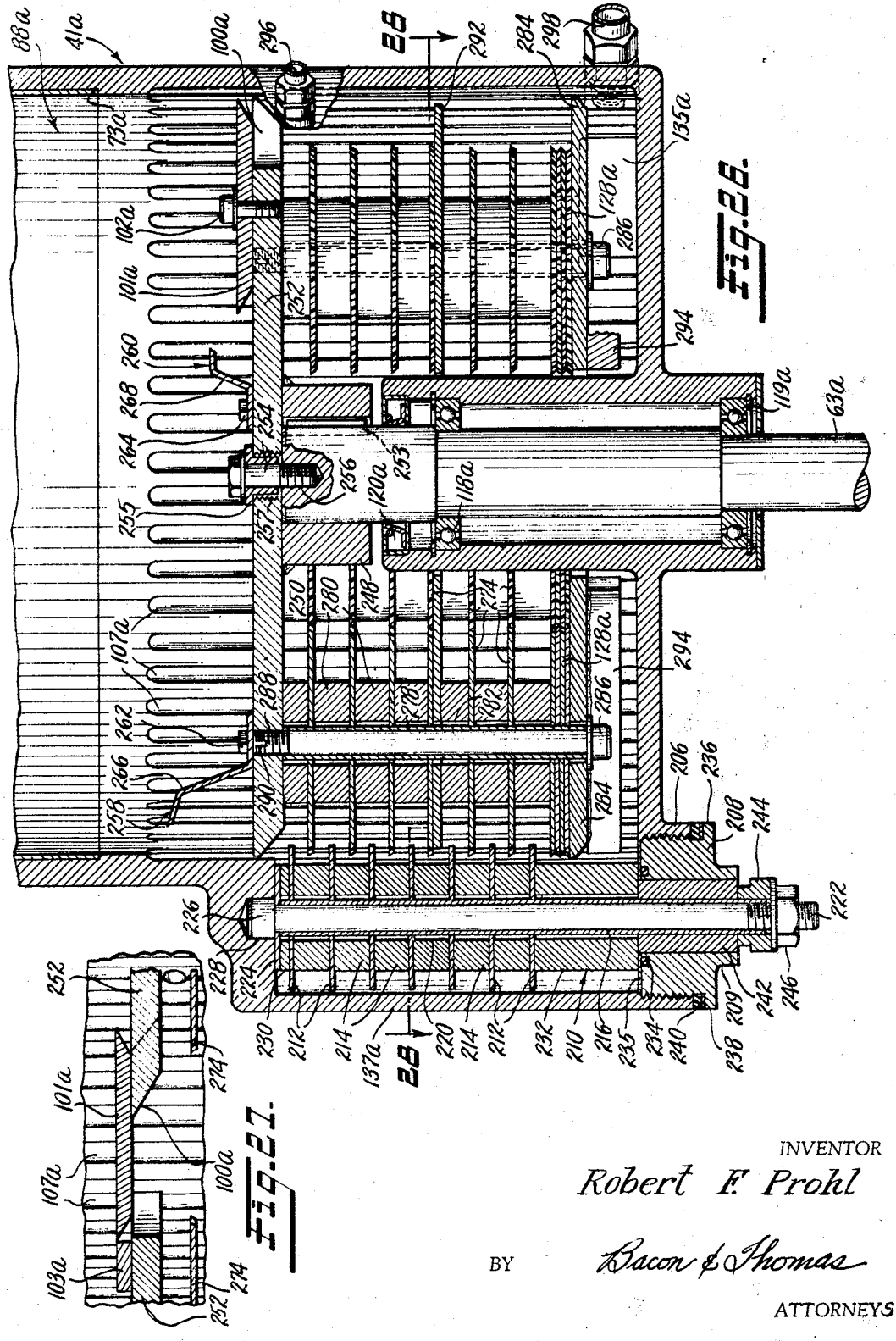

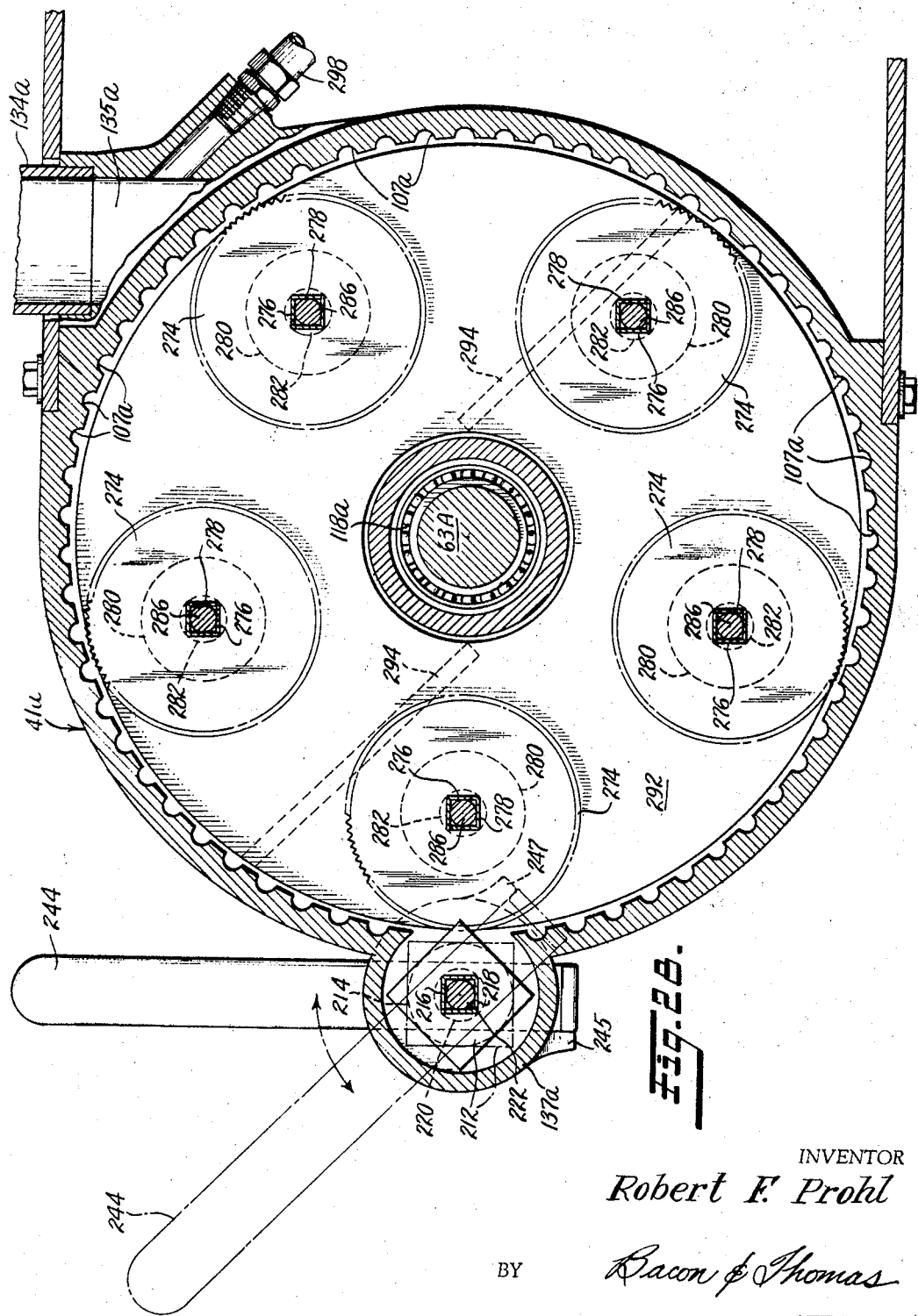

3,448,932
WASTE DISPOSAL DEVICES
Robert F. Prohl, 2715 Fargo St., Boise, Idaho 83703
Continuation-in-part of application Ser. No. 183,155,
Mar. 28, 1962. This application July 23, 1962, Ser.
No. 211,574
Int. Cl. B02b 5/02; B02c 11/08, 9/04
U.S. Cl. 241—42                                22 Claims This application is a continuation-in-part of my application Ser. No. 183,155, filed Mar. 28, 1962, and now abandoned.

The present invention relates to waste disposal devices and, more particularly, to waste disposal devices that embody improvements over the device disclosed in Patent No. 2,950,065, granted Aug. 23, 1960.

More specifically, the invention comprises waste material, or garbage disposal, units of a heavy-duty type adapted to be used with equal effectiveness in different environments and for grinding up a large variety of vegetable and fruit waste materials. For example, the present waste disposal units are particularly useful on truck farms, in supermarkets or the like, fruit and vegetable processing plants, hotels, restaurants, various institutions, and other establishments wherein there is a problem of disposing of a large volume of waste material or trimmings, which otherwise would require storing in containers and hauling for disposal.

The invention further comprises garbage or waste disposal units of large capacity, and which are capable of quickly disposing of waste material in large quantities. For example, a barrel of ordinary garbage or waste material can be ground or chopped up by the present unit within the short interval of one minute.

Different types of waste material present different disposal problems, in that soft materials, such as watermelons, cantaloupes and squash, including their seeds, can be readily and quickly disposed of; whereas, ears of corn with the husk in place, present a difficult disposal problem because of the fibrous character of the husk, which renders it hard to handle and cut into small pieces, and which places a heavy operating load on the equipment. Another problem that is presented by materials difficult to dispose of is that, should the unit be shut off while loaded with such materials, an unduly great torque is required to start rotation of the cutter assembly.

Briefly, the waste disposal devices disclosed herein include a frame providing a support for a housing containing a cutting or grinding chamber. A hopper is disposed above the chamber for receiving a supply of waste material to be fed to the chamber. A rotary cutter assembly is mounted in the chamber on a main shaft, driven by an electric motor. The rotary cutter assembly includes a feed plate or upper circular portion, having mulching knives mounted thereon for effecting a preliminary cutting and distribution of the waste material in the chamber. A stationary cutter bar assembly is mounted upon the wall of the chamber and includes a blade or anvil that cooperates with a feed knife mounted upon the top of the rotary cutter assembly. The feed knife is provided with a cutting edge that is located at a predetermined height above the top surface of the rotor assembly to initially cut waste material to a desired reduced size. The feed knife partially overlies a feed slot formed at the outer margin of the feed plate. The reduced-size material cut by the feed knife passes through the feed slot to a series of serrated grinding knives disposed below the feed plate. Vertical grinding grooves are formed in the chamber wall surrounding the rotary cutter assembly and retard movement of waste material by the rotor so that the grinding knives can more rapidly masticate the same. The grinding knives are preferably arranged in stacks with intervening spacers and are circumferentially distributed about the rotor assembly to perform a secondary grinding operation wherein the waste material is reduced to the desired fineness before it can pass beyond a retainer plate at the bottom of the rotor assembly.

In order to facilitate disposal of fibrous waste materials, such as corn husks, a set of finger knives or blades is provided at one side of the chamber and arranged so that they can be optionally extended into the spaces between the grinding knives carried by the rotor. The finger knives are stationary and form abutments against which waste material not retarded by the grinding grooves can be carried by the grinding knives and momentarily held while the grinding knives continue their movement and cut therethrough. The finger knives also effect a cleaning function by preventing waste material from becoming clogged between the grinding knives. The finger knives are not required for all grinding operations and, hence, may be manually retracted when the functions that they perform are not needed. They can also be retracted to reduce the starting torque of the rotor assembly when the unit is stopped with the chamber loaded, and moved to their active position when the rotor assembly has reached normal speed.

The housing has an opening in a plane located just below the feed slot and through which a jet of water is introduced to flush material that has been fed into the space below the feed plate, and to facilitate circulation of the material in the zone of the grinding knives. The housing also includes a discharge outlet for waste material that has been reduced to the desired fineness, and has an opening in the plane of the discharged outlet through which another jet of water flows to facilitate flushing of the ground material through the outlet and through the piping connected with said outlet, whereby clogging of any drainpipe communicating therewith is avoided. In this connection, the rotor assembly includes impeller vanes for forcefully ejecting ground waste material and flushing water out of the bottom of the chamber.

A valuable feature of the present waste disposal devices is that all of the cutting or grinding elements are adjustable to position a sharp edge thereof in operative position to replace an edge that has become dull. The grinding knives, which also perform a cutting function, are arranged in stacks on a non-circular tube so that all knives in a given stack can be simultaneously rotated to position a sharp edge thereof in operative position to replace an edge that has become dull. The finger knives or blades, which perform a cutting or macerating function, are arranged, in one embodiment in a stack on a manually adjustable shaft and can be rearranged on said shaft to position a different portion thereof in active position; and in another embodiment are arranged upon a non-circular tube so that they are simultaneously adjustable.

The principal object of the invention is to provide a heavy-duty waste disposal device that is capable of quickly disposing of a large volume of various kinds of fruit and vegetable waste materials, including fruits, such as peaches, plums, cherries, etc., which contain stones.

Another object is to provide a waste disposal device in which the waste material is subjected to a primary cutting operation to reduce it in size, and wherein the reduced-size material is fed at a controlled rate to a zone in which a secondary cutting or final grinding operation is effected.

Another object is to provide a waste disposal device, as described above, wherein the size and rate of feed of waste material to the secondary cutting operation can be varied as desired to meet operating conditions in different environments.

Another object is to provide a waste disposal device, wherein the various parts are readily accessible for repair, replacement and/or adjustment, and wherein waste materials are quickly reduced to such size that they can be discharged into a drain or sewer pipe without danger of clogging the same.

Still another object is to provide a waste disposal device particularly embodying means for cutting and grinding fibrous vegetable waste materials.

A further object is to provide, in a waste disposal device, means for retarding or preventing movement of the waste material relative to a rotary cutter assembly.

A still further object is to provide a waste disposal device that is economical to manufacture and which is efficient and effective in operation, rugged in construction and fool-proof in use.

The foregoing and other objects of the invention will become apparent from the following description taken together with the accompanying drawings, wherein:

FIG. 1 is a side elevational view of one form of waste disposal device embodying the present invention, with the discharge pipe thereof shown in cross-section;

FIG. 2 is a front elevational view of the complete hopper assembly for the waste disposal device shown in FIG. 1;

FIG. 3 is a fragmentary vertical sectional view through the hopper, taken on the line 3—3 of FIG. 2;

FIG. 4 is an enlarged fragmentary sectional view through one of the pivot supports for the hood section of the hopper, taken on the line 4—4 of FIG. 3;

FIG. 5 is an enlarged fragmentary sectional view through one of the keepers and latching spools for the free end of the hood, taken on the line 5—5 of FIG. 4;

FIG. 6 is an enlarged fragmentary sectional view through the cover and one side wall of an enclosure for the drive motor, taken on the line 6—6 of FIG. 1;

FIG. 7 is an enlarged fragmentary sectional view through an adjustable mounting means for the motor, taken on the line 7—7 of FIG. 1;

FIG. 8 is an enlarged fragmentary perspective view showing the details of one of the hood keepers and latching spools;

FIG. 9 is an enlarged fragmentary plan view of the waste disposal device shown in FIG. 1 with the hopper removed to reveal the rotary cutter assembly and associated parts;

FIG. 10 is a perspective view of the stationary cutter bar assembly;

FIG. 11 is a vertical sectional view through the cutter bar assembly particularly showing the knife blade or anvil carried thereby, taken on the line 11—11 of FIG. 10;

FIG. 12 is a fragmentary vertical sectional view through the housing, rotary cutter assembly, and finger knives taken on the staggered line 12—12 of FIG. 9;

FIG. 13 is a horizontal sectional view through the housing, rotary cutter assembly, and finger knives, taken on the staggered line 13—13 of FIG. 12, and with the rotor shown about 30° out of phase clockwise compared with FIG. 9;

FIG. 14 is a fragmentary detail sectional view through the housing outlet and discharge pipe of the disposal unit;

FIG. 15 is a perspective view of one of the beveled, serrated grinding and cutting knives of the cutter assembly;

FIG. 16 is a perspective view of one of the beveled, serrated finger knives;

FIG. 17 is an inverted plan view of the rotary cutter assembly particularly illustrating the impeller blades attached to the bottom retainer plate thereof, as viewed on the line 17—17 of FIG. 12;

FIG. 18 is an enlarged fragmentary sectional view through the bottom retainer plate per se, and one of the impeller vanes, taken on the line 18—18 of FIG. 17;

FIG. 19 is an inverted plan view of the feed plate per se of the rotary cutter assembly;

FIG. 20 is an edge view of the feed plate per se, particularly illustrating the feed slot formed in the marginal edge thereof;

FIG. 21 is an enlarged fragmentary sectional view taken on the line 21—21 of FIG. 9 illustrating the manner in which the clamping band for the hopper assembly is mounted upon the cover plate of the motor enclosure;

FIG. 22 is a side elevational view of another form of waste disposal unit provided with a different type of hopper assembly from that shown in FIG. 1;

FIG. 23 is a vertical sectional view through the loading spout of the hopper, taken on the line 23—23 of FIG. 22;

FIG. 24 is an enlarged horizontal sectional view taken on the line 24—24 of FIG. 22 illustrating an improved form of rotary cutter assembly;

FIG. 25 is a fragmentary vertical sectional view through the cutter bar assembly and feed plate, taken on the line 25—25 of FIG. 24, the feed knife being dubbed in with dot-and-dash lines to illustrate its operative position relative to the cutter bar blade;

FIG. 26 is a vertical sectional view through the rotary cutter assembly and cooperating finger knife assembly, taken on the line 26—26 of FIG. 24;

FIG. 27 is a fragmentary sectional view through the feed knife, feed plate, and feed slot, taken on the line 27—27 of FIG. 24; and FIG. 28 is a horizontal sectional view through the rotary cutter assembly and feed knife assembly, taken on the line 28—28 of FIG. 26.

FIGS. 1 to 21, inclusive, of the drawings illustrate one embodiment of the invention; whereas, FIGS. 22 to 28, inclusive, represent another embodiment of the invention wherein certain improvements have been incorporated, thereby rendering the latter the preferred embodiment.

Referring to FIGS. 1, 12 and 13, the waste disposal device is generally identified by the numeral 40 and comprises a cast housing 41 having a generally cylindrical wall portion 42 providing a chamber 88 for receiving waste material. An enlargement 41A is formed at the opposite sides of the housing 41 to provide recessed shoulder portions 43. The housing 41 is supported by a frame structure 44, which includes a pair of vertical, spaced parallel side plates 45, each having an upright edge that abuts one of the shoulders 43. The plates 45 are secured to the housing 41 by cap screws 46. The opposite edges of the plates 45 are connected with an end plate 47, FIG. 1, by angle irons 141' and cap screws 141A. The angle irons extend below the lower edge of plates 45 and 47 to form the supporting legs for the frame. The end plate 47 may be bolted, welded, or otherwise secured to the angle irons 141'. A cover plate 48 rests upon the upper edge of the plates 45 and is secured thereto by brackets 49 and screws 50. The vertical leg of the brackets 49 is preferably welded to the plates 45. The end plate 47 has an inwardly extending strip 47A welded along its upper edge. Screws 47B secure the cover plate to the strip 47A.

The housing 41 has a hollow enlargement 137 formed integral therewith at its front side for a purpose that will be explained later. A boss 137A is formed exteriorly of the enlargement 137 and a leg 148 is secured thereto by cap screws 149. Thus, the waste disposal device 40 is provided with a three-legged support consisting of the two legs 141' and the leg 148.

As is shown in FIG. 1, a reset box 51 is mounted upon the end plate 47 of the frame 44. A switch box 52 having Start and Stop buttons 53 and 54 and a junction box 55 are mounted upon one of the side walls 45. It will be understood that the reset box 51, switch box 52 and junction box are suitably interconnected by electrical wiring, not shown.

Referring to FIG. 1, one of the side plates 45 is provided with spaced, horizontal slots 56. An electric motor 57 is disposed within the enclosure provided with spaced, horizontal slots 56. An electric motor 57 is disposed within the enclosure provided by the plates 45, 47 and 48, and is connected by conductors (not shown) with the switch box 52. The motor 47 has a base adjustably mounted upon the slotted plate by stud bolts 60, which extend through the slots 56. The motor 57 has a drive shaft 58 upon which a pulley 59 is mounted to drive a belt 61. The belt 61 extends around a pulley 62 on the lower end of a main shaft 63 rotatably mounted in the housing 41 in a manner described hereinafter.

A hopper assembly 64 is mounted upon the upper end of the housing 41 and includes a cylindrical wall section 65 that fits within the housing 41 and may rest upon a shoulder 73, FIG. 12, which serves as a stop for limiting downward movement of said wall section. The hopper 64 includes a flared wall portion 66 that merges into a generally rectangular wall section 67 that defines a pan. An L-shaped bracket 68 is secured to the cover plate 48 by a screw 69, FIG. 1. A clamping band 70 is welded to the upright leg of the bracket 68 and surrounds a portion of the wall section 65. The band 70 has apertured ears 71 connected by a bolt 72, which is tightened to secure the hopper in place on the housing 41. The clamping band 70 may be loosened to permit raising or vertical adjustment of the hopper 64, or to permit removal of the hopper when desired. The bolt 72 can be retightened to hold the hopper in any desired position relative to the housing 41.

The hopper 64, FIGS. 2 and 3, has a hood or lid 74 including a horizontally disposed top 75, vertically disposed side walls 76, and a vertically disposed end wall 77. Hinge elements 78 have their lower ends welded to the pan 67, FIG. 4, and pivot pins 79 serve to pivotally support the side walls 76 on the hinge elements 78 so that the lid can be pivoted back and forth between the solid line and the dot-and-dash line positions shown in FIG. 3.

The lid 74 is retained in closed position by latch members 80, one of which is best shown in FIG. 8. The latch members 80 are welded to the sides 76 and have slots 81 in their lower edge. The slots receive and co-act with grooves 84 formed in latch spools 82, the latter being mounted upon the pan 67 by bolts 83. The lid 74 has a horizontal depending flange 85, FIGS. 2 and 3 extending across the open front thereof, and a resilient flap 86 of rubber or plastic has its upper edge connected to the flange by a backing strip 86A and bolts 87. The flap 86 hangs down across the opening of the hopper 64 to prevent liquids or other materials from being splashed out of the hopper opening.

It will be apparent that material may be fed into the hopper by pushing the flap 86 inwardly out of the way, or by raising the flap 86 and folding it back onto the top wall 75 of the hopper to provide an unobstructed hopper opening. Alternatively, the lid 74 may be tilted to a partial or full open position beyond the dot-and-dash line position shown in FIG. 3 to facilitate hopper loading.

The housing 41 contains the chamber 88, which is directly below the hopper 64. A rotary cutter assembly 122 for grinding or comminuting waste material supplied to the chamber 88 from the hopper 64 is disposed in said chamber. The assembly includes a rotor body 113, FIG. 12, having an opening 114 which receives the upper end of the main drive shaft 63. The shaft 63 and rotor body 113 have cooperating keyways that receive a key 114A for providing a positive driving connection between said shaft and rotor body. The housing 41 has a horizontal bottom wall 116 and hollow axial hub extensions 117 and 117A that project upwardly and downwardly, respectively, from said bottom wall. The upper hub extension 117 is received in a recess 115 in the rotor body 113. Bearing assemblies 118 and 119 are arranged in the hub extensions 117 and 117A, respectively, and rotatably support the drive shaft 63 in the housing 41. A shaft sealing-ring assembly 120 is mounted at the extreme upper end of the hub extension 117 to prevent liquid or other material from leaking out of the chamber 88 along the shaft 63.

The rotary cutter assembly 122 further comprises a circular portion or feed plate 89 that is mounted directly upon the upper end of the main shaft 63 by a bolt 90 which extends through a bushing 90A in an opening 153' in said plate and into a threaded opening 156 in the upper end of said shaft. The feed plate has a series of countersunk holes 153 through which bolts 155 extend into threaded openings 153A in the rotor body 113 to secure the two together.

The feed plate 89, FIGS. 9 and 12, carries a mulching knife 108 that is mounted upon the upper surface thereof by a cap screw 110 and by the bolt 90 and the bushing 90A, all of which extend through a flat, intermediate base portion 109 of said mulching knife. The mulching knife 108 includes a short blade portion 111 and a relatively long blade portion 112, both disposed on an angle of about 45° relative to the feed plate 89, but extending in opposite directions. The blade portions 111 and 112 are beveled at their leading edges 111A and 112A, respectively, to provide sharp cutting edges for effecting a preliminary cutting up and distribution of waste material in the chamber 88. The blade portions 111 and 112 rotate in different concentric zones so that their paths of travel encompass substantially the entire cross-sectional area of the chamber.

The feed plate 89 has a circular feed knife 101 secured thereto by a cap screw 102, which extends into an opening 157 in said feed plate and into a threaded opening 102A, FIG. 13, in the rotor body 113, it being noted that the cap screw 102 is shown in a different angular position in FIG. 13 from that shown in FIG. 9. That is to say, it is about 30° out of phase, clockwise. The feed knife 101 has an inwardly and downwardly beveled periphery forming a cutting edge in the plane of the top surface of said knife. A feed slot 100 is formed at the marginal edge of the feed plate 89, as is best shown in FIGS. 9, 19 and 20. The feed slot 100 has a concentric wall 100A that underlies the feed knife 101 and terminates at its leading edge in a vertical wall 100B. The wall 100B is arcuate and diverges outwardly relative to the periphery of the feed knife 101. The trailing edge of the wall 100A terminates at a wall 100C beveled downwardly and away from the wall 100B on an angle of about 45°.

The feed knife 101 overlaps with the major portion of the feed slot 100, as is best shown in FIG. 9, so that a gap is formed between the beveled edge of the feed knife 101 and the adjacent end 100B of the feed slot 100. This gap controls the rate at which material can feed downwardly past the feed plate 89. This rate can be varied by increasing or decreasing the thickness of the feed knife 101, whereby to vary the width of the gap between said feed knife and the feed slot 100. A feed control block 103 is mounted upon the feed plate 89 by screws 104 threaded in openings 106 in the feed plate, the block being disposed adjacent the periphery of the knife, whereby to prevent the waste material in the chamber 88 from becoming wedged under the undercut, beveled portion of the feed knife 101 as the feed plate 89 is rotated. The block 103 is shown in FIG. 9 extending slightly beyond the wall 100A of the feed slot 100, wherefrom it will be apparent that the rate of feed of material into said slot can also be controlled to some extent by varying the length of feed block beyond the outer screw 104.

The feed knife 101 cooperates with a stationary cutter bar 91 mounted within the chamber 88 on the inner surface of the wall portion 42 of the housing 41. The cutter bar 91 is shown in FIGS. 9 to 12, inclusive, and comprises a block 91A secured to the wall portion 42 by cap screws 93 whose heads are located outside of the chamber 88. The cap screws 93 extend through the wall 42 and into the horizontal, threaded openings 92 in the block 91A. The bottom edge of the block 91A is disposed high enough above the feed plate 89 to provide for the use of a feed knife of maximum thickness. The block 91A has an upper inclined surface 94 which prevents waste material from collecting on top of the block.

A recess 95 is formed in one end of the block 91A for the reception of a rectangular blade or anvil 96. The blade 96 is held in position by a clamping plate 97 and a screw 98 that extends through an opening 97A in the plate 97, through an enlarged opening 96A in the blade 96 and into a threaded opening 91B (FIG. 9) in the block 91A. A vertical opening 99 is drilled in the block 91A in alignment with the blade 96. The purpose of the opening 99 is to facilitate adjustment of the stationary blade 96 with proper clearance relative to the feed knife 101. Thus, in effecting adjustment of the blade 96, the feed knife 101 is moved into position beneath the block 91A and a feeler gauge or sheet of material of a thickness, corresponding to the desired clearance, is placed upon the feed knife 101 and the blade 96 is then lowered into engagement therewith. A pin or instrument (not shown) may be inserted through the opening 99 to hold the blade 96 in engagement with the feeler element while the screw 98 is tightened. The oversized opening 96A in the blade 96 provides ample clearance for adjustment of the blade to accommodate feed knives such as 101, of various thickness.

The stationary blade 96 cooperates with the rotating feed knife 101 to cut up any waste material that has become lodged adjacent to, or is moved against, the stationary cutter bar 91, and lies in the path of said feed knife. The waste material thus cut is forced underneath the feed knife 101, through the feed slot 100 and into the space below the feed plate 89.

The rotor body 113 is provided with a plurality of circumferentially spaced, arcuate pockets 121, FIG. 13, each designed to receive a set of grinding knives 132. The grinding knives 132 are arranged in stacked relation with a spacer 123 disposed between adjacent knives. Each grinding knife 132 is circular, has a beveled serrated cutting edge 132A, and an axial rectangular opening 124, as shown in FIG. 15. Each spacer 123 is a circular segment having a portion 123A of approximately the same diameter as the pockets 121 and an arcuate portion 123B of approximately the same radius as the rotor body 113, so that the rotor assembly is fully circular in horizontal planes passing through the spacers 123. Each spacer 123 has a circular opening 123C of a diameter approximately equal to the diagonal distance across the corners of the rectangular opening 124 in the grinding knife 132. Each spacer 123 also has a keyway for receiving a key 151 of sufficient length to extend across all of the spacers in the one stack of grinding knives. A keyway is also formed in the rotor body 113 so that the key 151 prevents the spacers 123 from turning relative to said rotor body.

A hollow rectangular tube 126 extends through the openings 124 in the grinding knives 132 and the openings 123C in the spacers 123, the dimensions of the tube being such that the tube is received in the openings 123C in the spacers 123 with a free rotating fit, but without excess clearance. A group of four superimposed final grinding knives 128, FIG. 12, is located below the lowermost spacer 123. A retainer plate 129 is positioned below the grinding knives 128 and is engaged with the lower face of the rotor 113. The feed plate 89 is secured to the rotor body 113 by countersunk screws 155 which extend through countersunk openings 153 in the feed plate 89 and into aligned threaded openings in the rotor body 113, as previously explained. The retainer plate 129 has five circular openings 159 to rotatably receive the lower end of the tubes 126. An "Allen" screw 127 having a washer adjacent its head engaged with the retainer plate 129, extends through the tube 126 and into a threaded opening 154 in the feed plate 89. The screws 127 serve to nonrotatably clamp the stacks of alternate grinding knives 132 and spacers 123 between the feed plate 89 and the retainer plate 129. The upper end of the screws 127 has a screw driver slot 127A to enable the same to be turned from above the feed plate 89.

The edges of the grinding knives 132 are sharpened to present a cutting edge adjacent the grinding grooves 107 of the chamber 88. The outside diameter of the grinding knives 132 is such that they clear the key 151 and are spaced about $\frac{1}{16}''$ inwardly of the inner surface of the wall 42 of the housing 41.

The retainer plate 129 is disposed adjacent the bottom wall 116 of the housing 41 in the zone of a pump chamber 130. A pair of spaced vanes 131, FIG. 17, is welded to the lower face of the retainer plate 129 and converts the same into an impeller generally identified by the numeral 133. A discharge pipe 134 communicates with the pump chamber 130 through a port 135, FIG. 14, whereby counter-clockwise rotation of the rotor body 113 will produce a force through the impeller 133, to effect positive discharge of ground waste material from the lower end of the chamber 88.

The grinding action of the stacks of grinding knives 132 is facilitated by introducing a jet of flushing water into the chamber 88 through an opening 41C in the housing 41 in a region between the feed plate 89 and the uppermost grinding knife 132. The opening 41C communicates with a boss on the housing 41 in which a conventional fitting 41D is mounted, and which has a water supply pipe 41E connected thereto.

The discharge of ground material from the bottom of chamber 88 is facilitated by providing a relatively large opening 41F in a boss on the housing 41 at the outlet port 135 for the discharge of a high pressure flushing jet of substantial volume. A conventional fitting 41G and water supply pipe 41H are connected to the boss.

The enlarged housing portion 137 contains a finger knife assembly generally identified by the numeral 136. The housing 41 has an opening 137B formed in the bottom wall 116 thereof in alignment with the housing portion 137. A flanged plate 138 forms a closure for the opening and is secured to the housing 41 by cap screws 139. A gasket 138A is disposed between the plate 138 and wall 116 to provide a seal.

The finger assembly 136 includes a shaft 140 that extends through an opening 137C in the upper wall of the housing extension 137. A handle 146 is keyed to the upper end of the shaft 140 and is secured in place by a cap screw 146A. The plurality of superimposed spacers 141 and finger knives 142 are mounted upon the shaft 140 in stack formation. The shaft 140 has a shoulder 140A at its upper end engaged with the uppermost spacer 141, and has a reduced threaded portion 140B upon which a lock washer and a nut 140C are mounted to secure the stack of finger knives 142, and spacers 141 on said shaft. A pilot portion 140D is formed at the lower end of the shaft 140 and is received in a bearing recess 140E in the plate 138.

One of the finger knives 142 is shown in FIG. 16, wherefrom it will be noted that a segment of the knife has been cut away as indicated at 144 to provide a flat edge 142A and wherein the remainder of the periphery is beveled and serrated, as indicated at 142B. A circular opening 143 is provided to receive the shaft 140. Cooperating keyways are formed in the shaft 140 and finger knives 142, and a key 145 is disposed in said keyways to prevent said finger knives from rotating relative to said shaft.

The finger knives 142 are separated by the spacers 141 which, as shown in FIG. 13, include an arcuate portion 141A that has a close fit within the housing portion 137, and two flat portions 141B and 141C disposed at approximately right angles to each other. The portion 141B is shown in alignment with the edge 144A of a knife 142 and the other portion 141C is shown set back from the inner surface of the chamber 88.

The uppermost spacer 141 is approximately one-half as thick as the remaining spacers, so that the finger knives 142 are disposed in planes about midway between the grinding knives 132. The location of the shaft 140 is also such that a substantial portion of the finger knives 142, when in their active position, project into the chamber 88. Accordingly, as the rotary cutter assembly 122 is turned, any material that may be disposed between the stacks of grinding knives 132 is cut as the rotor moves the same past the stationary finger knives 142. The finger knives 142 intermesh with the grinding knives 132 and also clean out the spaces between the grinding knives 132 in each stack.

One of the important features of the present invention is that the finger knives 142 can readily be adjusted or rotated to an inactive position, that is, a position wherein they do not project into the chamber 88 or between the grinding knives 132. The foregoing adjustment of the finger knives 142 is effected by rotating the handle 146 counter-clockwise through an angle of about 90° from the full line position of said handle shown in FIG. 9, to the dotted line position, wherein the handle 146 engages a stop pin 150. Such movement of the handle positions the flat edge 144A of the finger knives 142 and the flat portion 141B of the spacers 141 in position across the opening between the compartment in the housing portion 137 and the chamber 88, as will be readily understood.

The rotary cutter assembly 122 rotates counter-clockwise, as shown by the arrows A in FIG. 9. Accordingly, the finger knife assembly 136 is designed so that, when the handle 146 is in the full line position shown in FIG. 9 engaged with the stop pin 150, the finger knives 142 are in their active position, and the tendency of the waste material being ground by the rotary cutter assembly 122 is to react against said finger knives to maintain them in said advanced position. Hence, manual operation of the handle 146 to the dot-and-dash line position in FIG. 9 is required to retract the finger knives.

The finger knives 142 may be made of $\frac{1}{16}''$ steel plate, and the finger spacers 141 may be made of any suitable aluminum alloy. The grinding knives 132 may be made of $\frac{1}{16}''$ thick steel plate and the grinding knife spacers 123 may be made of an alloy of aluminum. The feed knife 101 and the blade 96 are also preferably made of steel. More specifically all of the aforesaid knives are preferably made of a high carbon steel suitably tempered. This is also true of the mulching knife 108. Hardened knives are desirable to avoid wear by sand or any other abrasive particles contained in the waste material. The aluminum spacers 123 and 141 reduce the weight and inertia of the rotor assembly 122.

In one operative embodiment of the invention, the chamber 88 in the housing 41 has an inside diameter of 11''; the feed plate 89 has an outside diameter of $10^{15}/_{16}''$ providing an annular clearance space with the chamber of $\frac{1}{32}''$; and the retainer plate 129 has an outside diameter of $10^{7}/_{8}''$, providing an annular clearance space with the chamber of $\frac{1}{16}''$. These dimensions are given by way of example only and can be varied to suit the capacity and disposal requirements of any given unit.

It will be apparent that ready access may be had to all of the knives of the waste disposal device described hereinabove, for repair, adjustment, sharpening or replacement. In order to gain full access to the grinding knives 132, the entire rotor assembly 122 can be removed from the chamber 88. To do so it is only necessary to take out the bolts 93 and remove the cutter bar assembly 94; remove the bolt 90 and bushing 90A to disconnect the feed plate 89 from the top of the main shaft 63; loosen the bolt 110 to permit movement of the base 109 of the mulching knife 108 from above the threaded opening 153'; and to insert a bolt (not shown) of a size to fit the threaded opening 153' in the feed plate 89 and to turn said bolt against the adjacent end of the drive shaft 63 to cause it to function like a wheel puller to free the rotor assembly 122 from the drive shaft 63. It is to be understood, of course, that the finger knives 142 must first be moved to their inactive position so that they will not interfere with the raising of the rotary cutter assembly 122 out of the chamber 88.

Likewise, the finger knife assembly 136 can be readily removed from the housing portion 137 by taking out the bolts 139 and removing the plate 138; and disconnecting the lever 146 from the shaft 140 by removing the bolt 146A, whereby the stack of finger knives can then be removed through the bottom opening 137B.

It will also be apparent that the various knives of the device can be readily adjusted to present a sharp cutting edge in operating position. Thus, the stacks of grinding knives 132 can be individually rotated relative to the rotor body 113 by loosening the bolts 127 and turning the tubes 126 to simultaneously rotate all of the cutting knives in a given stack through an angle sufficient to place a new cutting edge in cooperative relation with the grinding grooves 107. The finger knives 132 can be repositioned to place a new cutting edge in operation simply by removing the knives from the shaft 140, inverting the knives, and then replacing them upon the shaft. Likewise, the cutter bar knife blade 96 can be repositioned by removing the screw 98 and the clamping plate 97 and turning the blade 96 through an angle of 90° to bring a new cutting edge into position. The cutting blade 96 is then adjusted relative to the feed knife 101, as previously described.

In the operation of the waste disposal device described above, the waste material may be loaded into the hopper 64 by pushing it past the flap 86, or the lid 74 can be partially raised and tilted to the dot-and-dash line position shown in FIG. 3 to enable the hopper 74 to be loaded from both sides. Also, the hopper lid 74 can be swung back as far as the rear edge of the rectangular pan 76 will permit, so that a container of material can be dumped directly into the hopper. Also, the hopper pan 67 can be built-in flush with a table top (not shown) so that waste can be displaced from said table top into the hopper 64. Material thus fed into the hopper 64 falls into the chamber 88 above the rotary cutter assembly 122.

With the motor 57 running, the belt 61 will drive the shaft 63 to turn the rotary cutting knife assembly 122 at high speed, for example, about 3400 r.p.m. The mulching knife 108, which is disposed above the rotor, serves primarily to reduce the size of leafy material so that the feed knife 101 can engage it and carry it against the cutter bar blade 96. Centrifugal force also aids by flinging outwardly waste deposited on the rotor to the outer region of the chamber 88 so that it can be engaged by the feed knife 101 and cut against the blade 96 and fed through the feed slot 100. The grinding grooves 107 in the chamber wall 42 assist the cutting actions of the mulching knife 108 and the feed knife 101 by retarding movement of the waste material relative to said grinding grooves. The grinding grooves 107 effect some grinding as the rotor assembly 122 tends to move the waste material past the same, but the principal function of said grinding groove is to hold the waste material, and to prevent such material from slipping around in the chamber 88 until it is cut. Of course, some waste material of small size may move downwardly at any point in the chamber 88 along the grooves 107.

Suitably sized waste material passes through the feed slot 100 in the feed plate 89, as has been previously described. It will be noted from FIG. 9 that the feed slot 100 is located between two stacks of grinding knives 132, so that the reduced-size waste material is fed directly to the zone of said grinding knives. These knives cut the waste material and distribute the same in the chamber 88 so that some of the waste material finds its way into the spaces intermediate the rotor and grooved wall and between the several stacks of grinding knives 132. The feed plate 89 serves to suspend the waste material above the rotor in the chamber 88 until its size has been reduced sufficiently to permit the same to pass through the feed slot 100 or, if very fine, to pass through the clearance space between the periphery of said feed plate and the chamber wall 42. Fine waste material can also move down the grooves 107. The retainer plate 129 constrains the waste material in the zone of the rotor body 113 until it is cut and ground to a size to allow it to pass through the annular clearance space between the chamber wall 42 and the periphery of the retainer plate 129. Here again, some material may move downwardly along the grooves 107. Thus, the retainer plate 129 holds the major portion of the waste material within the rotor assembly until it has become sized small enough for proper disposal. It will be understood that all of the waste material is not reduced to a pulp, and that some chunky material will get past the retainer plate 129. This is desirable in the interest of providing some roughage to scavenge the drain piping and to prevent fungus growth therein.

Fruit stones, such as peach stones and the like, are first cut or broken by the feed knife 101 and are subsequently further comminuted by the grinding grooves 107 and the grinding knives 132 without jamming, and eventually reduced to disposal size by the group of final grinding knives 128 adjacent the retainer plate 129. The finger knives 142, when in active position, also cooperate with the grinding knives 132 to break up fruit stones. The waste material after final sizing is discharged from the chamber 88 or pumping chamber 130 together with flushing liquid by the impeller 133, as previously described.

FIGS. 22–28 illustrate the preferred embodiment of waste disposal device, in that while this embodiment includes many of the principles and features described hereinabove, it also includes many simplified and improved structural features.

Referring to FIG. 22 the waste disposal unit is generally identified by the numeral 160 and includes a frame 44a comprising legs 141a, plates 45a, 47a and 48a, generally similar to the components of the frame 44 previously described. The frame 44a carries a motor 57a mounted thereon in the manner similar as the motor 57. Bolts 60a provide for adjustment of the motor to remove any excess slack in a belt 61a, which drives the main shaft 63a. The shaft 63a is mounted in a housing 41a by ball bearings 118a and 119a, FIG. 28. A shaft seal 120a prevents leakage from the chamber 88a. Three legs 148a, FIG. 22, are secured to the bottom wall of the housing 41a.

A hopper structure 64a is mounted upon the housing 41a in the same manner as the hopper 64. The hopper 64a includes a cylindrical throat portion 162 that may seat against a shoulder 73a, FIG. 26, within the housing 41a. The cylindrical portion 162, FIG. 22, merges into a flared portion 164 that terminates in a pan portion 166 having vertical sides 170 and 172 and a rear wall 174. The sides 170 and 172 are extended to the right, over the frame 44a and are connected with a bottom wall 176 to form a spout 178 for receiving waste material. A hood or lid 180 forms a cover for the hopper 64a and includes side wall extensions 182 and 184 and a rear wall 186 that fit within the side walls 170 and 172 and the rear wall 174 of the hopper 64a and spout 178. The side walls 182 and 184 each carry a bracket 188 having an offset lower end to fit over the edge of the side walls 170 and 172. Similarly, the rear wall 186 of the hood 180 carries a bracket 190 including an offset lower end that fits over the rear wall 174, and a hook portion 192 at its upper end to assist in removing and replacing the hood 180 on the hopper 64a. The hood 180 also includes a top wall 194 that is welded or otherwise secured to the side walls 182 and 184, and to the rear wall 186. The top wall 194 overlies the flared portion 164 of the hopper and extends to the right slightly therebeyond and terminates in a downwardly extending flange 196 to which a flap 198 of rubber or other flexible material is secured by a backing strip 199 and bolts 200. The flap 198 may be pushed inwardly by material being fed from the spout 178 during loading of the hopper 64a.

A headed pin 202 is mounted on the top of the wall 194, and the flap 198 has an opening 204, so that when the flap 198 is folded back onto the top wall 194, as indicated by the dot-and-dash lines in FIG. 22, the opening 204 can be passed over the pin 202 to hold the flap out of the way to facilitate feeding of waste material from the spout 178 into the throat 162 of the hopper 64a. When the disposal unit has been loaded through the hopper 64a and material is being ground therein, the flap 198 is placed in the full line position to prevent liquid or waste material from splashing out of said hopper. The bottom wall 176 of the spout 178 slopes toward the throat 162 so that any juices or other liquid present with the waste material can flow by gravity down the spout.

The housing 41a, FIG. 26, is generally similar to the housing 41, except that the lateral enlargement 137a, which receives the set of finger knives is smaller and of modified construction. Thus, instead of using a large plate 138, the housing 41a is provided with an internally threaded, depending boss 206 in which a threaded plug 208 is mounted. The plug 208 has an extension 209 engageable by a wrench for turning, and retains a finger knife set assembly 210 within the compartment provided by the housing enlargement 137a. This assembly includes knife or blade elements 212 that are substantially square, as shown in FIG. 28, and may be cut from 1/16" steel plate without any of the edges thereof being sharpened, although it will be understood that the corners of said finger knives may be sharpened if desired. Adjacent finger knives 212 are separated by spacers 214. These spacers may be cut from circular bar stock of aluminum alloy in the interest of simplicity and economy of construction. Each of the finger knives 212 has a rectangular opening 216 corresponding in size to a rectangular tube 218 upon which they are mounted. The spacers 214 preferably have a circular opening 220 large enough to receive the tube 218. An "Allen" screw 222 extends through the tube 218 and has a washer 224 under its head 226. The head 226 is rotatably received in a hole 228 formed in the top wall of the housing enlargement 137a. A relatively thin spacer 230 is positioned between the washer 224 and the uppermost finger knife 212. A relatively thick spacer 232 is disposed below the lowermost finger 212. One or more shims 235 are positioned between the spacer 232 and the plug 208. An O-ring 234 is mounted in the plug 208 to form a seal between said adjacent shim and plug. The plug 208 has a flange 236, which is engaged by a washer 238, which in turn engages a gasket 240 for providing a seal between the plug and the housing boss 206.

The plug 208 contains a bushing 242 in which the tube 218 is mounted. This tube extends to a point below the bushing 242 and has a handle 244 mounted thereon for effecting rotary adjustment of said tube. The handle 244 is maintained assembled with the tube 218 and to the screw 222 by a washer and nut 246 that are mounted on the lower end of the screw. It will be understood that rotation of the handle 244 through an angle of 45° from the full line position engaged with stop 245 shown in FIG. 28, to the dot-and-dash line position to engage stop 247 will project the finger knives 212 into the chamber 88a and the spaces between the stacks of grinding knives (described hereinafter), and that by moving the handle in the reverse direction, the stack of finger knives can be retracted. The rectangular tube 218 assures that all of the finger knives 212 will be simultaneously advanced and retracted. The stops 245 and 247 may be cast on the housing 41a.

A significant improvement in the embodiment shown in FIGS. 22 to 28 is that the rotor casting 113 with its individual pockets for the sets of grinding knives, has been completely eliminated. In lieu thereof, a short cylindrical sleeve 248, FIG. 26, is welded as at 250 to the underside of a feed plate 252. A key 253 secures the sleeve 248 in non-rotatable relation on the drive shaft 63a. The feed plate 252 is generally similar to the feed plate 89 and is secured to the upper end of the drive shaft 63a by a cap screw 254 received in a threaded opening 256 in the upper end of the shaft 63a. The cap screw 254 extends through a bushing 255 that projects into a threaded opening 257 in the feed plate 252. The purpose of the bushing 255 and threaded opening 257 is the same as that of the bushing 90a and the threaded opening 153.

The feed plate 252 has a marginal recess 100a, FIGS. 24 and 26, that functions as a feed slot in the same manner as the slot 100. A feed knife 101a similar to the feed knife 101 is secured to the feed plate 252 in overlapping relation to the feed slot 101a by a cap screw 102a. A block 103a similar to the block 103 is mounted upon the feed plate 252 by screws 104a. The feed knife 101a cooperates with a stationary cutter bar 91a similar in all respects to the cutter bar 91. In this connection, the like parts of the cutter bar 91a have been identified by the corresponding numerals applied to the cutter bar 91.

A further improvement in the embodiment of FIGS. 22 to 28 resides in the provision of two mulching knives 258 and 260, FIGS. 24 and 26, which are respectively secured to the feed plate 252 by bolts 262 and 264. The mulching knife 258 is located adjacent the outer portion of the feed plate 252 and has an offset 266 formed therein so that the blade as a whole is closer to the cutter bar assembly 91a and more efficiently functions to chop and deliver waste material to said cutter bar to be cut by the feed knife 101a. The mulching knife 262 also has an offset therein, as indicated at 268, FIG. 26, to facilitate cutting and distribution of the waste material in the chamber 88a. The leading edge 270 of the blade 258 is inclined in a direction such that, as the feed plate 252 is rotated counterclockwise, any relative movement between the blade and the material in the chamber 88a will tend to force the material outwardly toward the grinding grooves 107a to effect an abrading, as well as a cutting action, as the waste material is moved toward the stationary cutter bar assembly 91a. Likewise, the leading edge 272 of the blade 260 tends to feed the waste material outwardly from the central portion of the feed plate 252. Moreover, the offset portion 266 of the blade 258 cooperates with the stationary cutter bar assembly 91a in breaking up the waste material as the feed plate 252 is rotated at high speed.

The embodiment in FIGS. 22 to 28 also includes five sets or stacks of grinding knives 274, as is best illustrated in FIGS. 26 and 28. Each of the grinding knives 274 has a square opening 276 to receive a hollow tube 278 of corresponding cross-section. The grinding knives 274 are separated by circular spacers 280, each of which has a round opening 282, large enough to receive the tube 278. A lower group of final grinding knives 128a is disposed between the lowermost spacer 280, and a retainer plate 284. An "Allen" screw 286 extends upwardly through the retainer plate 284 and the stacked grinding knives 274 and spacers 280 and is received in a threaded opening 288 in the feed plate 252. The upper end of the screw 286 is preferably provided with a screw driver slot 290 to facilitate tightening or loosening of the screw from above the feed plate 252.

The assembly of the five stacks of grinding knives with the feed plate 252 and the retainer plate 284 is rendered more rigid and stable by disposing an annular partition 292, FIG. 26, at a point about midway of the height of the stack of grinding knives. The partition 292 has an outer diameter which is slightly smaller than the outer diameter of the feed plate 252 and the retainer plate 284, so that it permits the passage of larger particles through the space above the partition to the space below the same. An opening 293 is provided in the partition 292 for each of the tubes 278.

The retainer 284 has vanes 294, similar to the vanes 131, welded to the lower side thereof and disposed parallel to a diametrical line through the axis of the shaft 63a. The impeller vanes 294 function to displace sized material from the housing 41a through a discharge port 135a, FIG. 28, having a discharge pipe 134a similar to the pipe 134 connected therewith.

A jet of water is supplied through a pipe 296 for facilitating grinding and circulation of the waste material in the zone below the feed plate 252. A relatively larger pipe 298 provides a jet at the port 135a to facilitate flushing of the ground waste material from the space below the retainer plate 284 through the discharge pipe 134a.

It will be clear from the foregoing that the finger knife spacers and the grinding knife spacers may be cut from circular bar stock instead of being cast in a special shape and provided with keys or keyways to prevent rotation, as in the embodiment shown in FIGS. 1 to 21. This greatly simplifies the construction, facilitates assembly, and reduces the cost of manufacture.

The general mode of operation of the embodiment shown in FIGS. 22 to 28 is generally similar to that described in connection with the embodiment shown in FIGS. 1 to 21, with the advantages of a simplified and much lighter rotor structure and more efficient grinding of the material through the presence of the partition 292. Also, access to the parts is simplified, in that the finger knife set can be preassembled as a unit and mounted in and removed from the enlargement 137a of the housing. The removal of the feed plate 252 and the sets of grinding knives assembled therewith remains equally simple, in that the entire rotor assembly can be detached from the shaft 63a by removing only the single bolt 254 and threading a bolt into the threaded opening 257 to pull the entire rotor assembly off the shaft 63a, in the same manner described in connection with the rotor assembly 122.

It is further pointed out that, in many geographical areas, the water pressure available may be inadequate to carry all the waste which the machine can produce operating at full capacity. If this situation occurs, a thinner feed knife can be used to thereby cut down in the height of the bite of the feed knife to effect the feeding of less material through the unit. This is an important factor in certain applications of the device, where a given material, other than waste, is to be sized and be retained for further use instead of merely being expelled into a sewer. Thus, in certain instances, it may be desirable to process a greater quantity of material of coarser grade than of a finer grade, and this can be accomplished by taking the following steps:

(1) Removing a given number of grinding knives and a corresponding number of finger knives.

(2) Employ a thicker feed knife for greater feed capacity of the coarse-sized material.

(3) Use smaller diameter feed and retainer plates which will permit the passage of a coarser material between their outer edges and the housing.

(4) By removing one or more of the stacks of grinding knives and replacing the same with a plain or knifeless spacer.

On the other hand, if the size of the ground material is to be finer, more blades can be added by using thinner spacers between the grinding knives and finger knives. Also, by providing a thinner feed knife 101 and increasing the speed of the rotary cutter, finer cutting can be accomplished.

It will be understood that various changes may be made in the proportions, details and relationship of the parts described and illustrated herein without departing from the principles of the invention or the scope of the annexed claims.

I claim:

1. In a waste disposal device, a housing having a cylindrical chamber for receiving waste material; a shaft rotatably mounted in said housing; a rotor mounted upon said shaft and disposed in said chamber in spaced relation thereto; a feed plate slightly smaller in diameter than said chamber carried by said rotor; cutter means in said chamber above said feed plate for effecting an initial reduction in the size of waste material deposited in said chamber; means at the margin of said feed plate controlling the rate of feed of the reduced-size waste material from said cutter means to the space between said housing and said rotor, said plate including a feed slot extending therethrough at the margin thereof, and said means controlling the rate of feed including a feed knife mounted upon said plate and partially overlapping said feed slot; and means rotatable with said rotor for further reducing the size of the waste material.

2. A waste disposal device as defined in claim 1, in which the chamber has longitudinal grooves in its walls in the area thereof surrounding the rotor for retarding movement of waste material relative to said rotor.

3. In a waste disposal device, a housing having a cylindrical chamber for receiving waste material; a shaft rotatably mounted in said housing; a waste material cutter assembly mounted upon said shaft and disposed in said chamber, said assembly including rotor means and a plurality of stacks of grinding knives circumferentially spaced about the outer periphery of said rotor means and rotatable with said rotor means, the grinding knives of each stack being substantially equally spaced axially; and fingers mounted in the housing and disposed in planes lying between those occupied by the grinding knives.

4. A waste disposal device as defined in claim 3, wherein the fingers are mounted in a hollow enlargement of the housing disposed outwardly of the cylindrical chamber and project into said chamber, and wherein said fingers are adjustably mounted in said enlargement for retraction from said chamber.

5. In a waste disposal device, a housing having a cylindrical chamber for receiving waste material; a shaft rotatably mounted in said housing; a waste material cutter assembly mounted upon said shaft and disposed in said chamber, said assembly including a plurality of circumferentially spaced, independent stacks of grinding knives; means in said chamber for effecting an initial reduction in size of waste material deposited in said chamber; and means carried by said cutter assembly controlling the rate of feed of the reduced-size waste material to said stacks of grinding knives.

6. In a waste disposal device, a housing having a cylindrical wall defining a chamber for receiving waste material; a horizontal feed plate of slightly smaller diameter than the internal diameter of said cylindrical wall mounted for rotation in said chamber, said plate having a feed slot extending therethrough; a feed knife mounted upon said plate and partially overlapping said slot; and a stationary cutter bar projecting inwardly from said wall above said plate and positioned to cooperate with said feed knife to chop waste material and to effect feeding of the chopped material through said slot.

7. A waste disposal device as defined in claim 6, in which the feed slot is formed in the marginal edge of the feed plate.

8. A waste disposal device as defined in claim 6, in which the feed knife is circular, of a predetermined thickness, and has its periphery beveled inwardly toward said plate to provide a gap cooperable with the feed slot for controlling the size and rate of feed of material through said slot in said feed plate.

9. A waste disposal device, as defined in claim 8, in which a block is mounted upon the feed plate in advance of, and adjacent to said feed knife, for further controlling the volume of waste material that can pass under said feed knife and through said slot.

10. A waste disposal device, as defined in claim 8, wherein the stationary cutter bar comprises a block mounted upon the cylindrical wall, a blade carried by said block, and means for vertically adjusting said blade relative to the feed knife.

11. In a waste disposal device, a housing having a cylindrical wall defining a chamber for receiving waste material; a shaft rotatably mounted in said housing; rotor means carried by said shaft and disposed in said chmber, said rotor means including a circular portion of slightly smaller diameter than said chamber, said circular portion having a waste material feed slot extending therethrough; means above said circular portion for reducing waste material to a size smll enough to pass through said feed slot; a series of grinding knives having cutting edges confronting said cylindrical wall disposed below said circular portion and rotatable therewith for further reducing the size of the waste material passed through said feed slot; a retainer plate disposed below said grinding knives and rotatable with said circular portion, said retainer plate being slightly smaller in diameter than said chamber; and means fastening said circular portion, grinding knives, and retainer plate together.

12. A waste disposal device as defined in claim 11, wherein a partition is disposed approximately midway between the circular portion of the rotor means and the retainer plate, and wherein the housing has an inlet for a water jet located in a plane between said circular portion and said partition.

13. A waste disposal device as defined in claim 11 wherein the housing has a discharge opening at the bottom of the chamber, and has an inlet for a water jet in the plane of said discharge opening, and wherein the retainer plate is located near the bottom of said chamber and has impeller vanes at its lower side for expelling ground up waste material from below said retainer plate through said discharge opening.

14. In a waste disposal device, a housing having a cylindrical chamber for receiving waste material; a shaft mounted in said housing for rotation about a vertical axis; and a waste material cutter assembly mounted upon said shaft and disposed in said chamber, said ssembly including a rotor body having a plurality of circumferentially spaced, vertical pockets in its periphery, a stack of grinding knives disposed in each of said pockets, a circular plate at the upper end of said rotor body, said plate being slightly smaller in diameter than said chamber and having a waste material feed slot extending therethrough, and means on said plate arranged to direct waste material through said slot to said stacks of grinding knives at a controlled rate.

15. In a waste disposal device, a rotary cutter assembly, comprising: a generally circular plate adapted to be non-rotatably connected with a shaft; a plurality of independent stacks of alternate spacers, and knives projecting outwardly beyond said spacers disposed at one side of said plate and circumferentially spaced relative thereto; a retainer plate disposed below the stacks of knives, there being a plurality of grinding knives disposed between the retainer plate and the spacer nearest to said retainer plate; and means securing said circular plate, stacks of knives and retainer plate in assembled relation.

16. In a waste disposal device, a rotary cutter assembly, comprising: a generally circular rotor body having a series of circumferentially spaced, marginal pockets; a plate mounted at one side of said rotor; a retainer plate at the other side of said rotor; a stack of alternate spacers and knives positioned in each of said pockets; and means retaining said spacers and knives in assembled relation with said plate and said retainer.

17. In a waste disposal device, a housing having a cylindrical chamber for receiving waste material; a main drive shaft mounted in said housing for rotation about a vertical axis; a rotary cutter assembly mounted upon said shaft, said assembly comprising a rotor body having a series of circumferentially spaced marginal pockets; a feed plate mounted at the top of said rotor, said feed plate being slightly smaller in diameter than said chamber and including means for feeding waste material therethrough at a controlled rate; a retainer plate at the bottom of said rotor, said retainer plate being slightly smaller in diameter than said feed plate; a stack of alternate spacers and knives positioned in each of said pockets; means retaining said knives against rotation relative to each other; and means retaining said knives and spacers in assembled relation with said feed plate rotor body, and retainer plate, and preventing relative rotation between said knives and said rotor body.

18. In a waste disposal device, a stack of alternate spacers and blades; a hollow, non-circular member extending through said stack, said blades having an opening of a size and configuration substantially corresponding to the outer cross-sectional configuration of said hollow member, whereby all of said blades may be simultaneously rotated by turning said hollow member; an element at each end of said stack; and means cooperating with said elements to retain said stack and hollow member is assembled relation.

19. In a waste disposal device, rotor means intended for mounting upon a drive shaft; a stack of alternate spacers and blades; a hollow, non-circular tube extending through said stack, said blades having a non-circular opening of a size and configuration substantially corresponding to the outer cross-sectional configuration of said tube, whereby turning adjustment of said tube will effect rotation of all of the blades of said stack; and means extending through said tube for securing said stack to said rotor means in non-rotatable relation thereto.

20. A waste disposal device, comprising: a frame; a housing supported by said frame having a wall defining a cylindrical chamber for receiving waste material; a storage hopper for waste material mounted upon said wall above said chamber; a shaft mounted in said housing for rotation about a vertical axis; drive means connected with said shaft; rotor means carried by said shaft; rotor means carried by said shaft disposed in said chamber, said rotor means including a circular portion of slightly smaller diameter than said chamber; mulching knife means mounted upon said circular portion for chopping and distributing waste material in said chamber from said hopper, said circular portion having a feed slot extending therethrough; a feed knife mounted upon said circular portion and partially overlapping said slot; a stationary cutter bar projecting inwardly from said wall above said circular portion and including a blade positioned to cooperate with said feed knife to chop waste material to a size to pass through said feed slot and to aid in effecting feeding of the chopped waste material through said feed slot; a plurality of stacks of alternate grinding blades and spacers disposed below said circular portion; a retainer plate below said stacks of spacers and grinding blades; means securing said circular portion, stacks of spacers and grinding blades, and retainer plate in assembled relation, including means holding the grinding blades of said stacks from relative rotation with respect to each other, and holding said stacks of grinding blades from rotating relative to said circular portion and retainer plate, the wall defining said chamber having longitudinal grooves formed therein in the portion thereof surrounding said rotor means to retard movement of waste material relative to said chamber walls, said housing having an enlargement at one side thereof providing a compartment communicating with said chamber; a stack of alternate spacers and finger blades located in said compartment; means retaining said finger blades from rotating relative to each other and relative to said compartment; means for adjusting said finger blades from a retracted position within said compartment to a position in which they extend between the grinding blades, said last-mentioned means including a handle adjustable from the exterior of said enlargement, said housing having an inlet for a water jet located in the plane of said stacks of grinding blades, but below said circular portion, said housing also having a discharge opening at the bottom of the chamber and an inlet for a water jet in the plane of said discharge opening, said retainer plate being located near the bottom of said chamber; and impeller vanes attached to said retainer plate at the lower side thereof for expelling waste material from said chamber through said discharge opening.

21. A waste disposal device as defined in claim 20, wherein the hopper includes: a lower, hollow uylindrical portion telescoping with the housing wall defining the waste receiving chamber, a flaring portion extending upwardly from said hollow cylindrical portion and forming a rectangular opening bordered by pairs of upwardly extending confronting walls defining a rectangle, a rectangular hood positioned above said rectangular opening, means on one pair of said confronting walls adjacent one end thereof pivotally supporting said hood, latch means on said one pair of confronting walls adjacent the opposite end thereof cooperating with means on said hood to retain said hood in closed position, said rectangular hood being open at one side thereof, and a flexible flap connected with said hood and forming a closure for said open side.

22. A waste disposal device as defined in claim 20, wherein the hopper includes: a lower, hollow cylindrical portion telescoping with the housing wall defining the waste receiving chamber, a flaring portion extending upwardly from said hollow cylindrical portion and forming a rectangular opening bordered by an upright end wall and side walls, said side walls having extensions joined by a bottom wall to form a spout leading to said rectangular opening; and a hood mounted upon said hopper having a rear wall and side walls disposed within and supported by the rear and side walls of said hopper, a top wall overlying said rectangular opening, and a flexible flap depending from said top wall and extending toward said spout.

References Cited

UNITED STATES PATENTS

| | | | |
|---|---|---|---|
| 1,174,646 | 3/1916 | Beckwith. | |
| 2,594,250 | 4/1952 | Tranburger | 241—46.1 |
| 2,650,708 | 9/1953 | Norton. | |
| 2,697,558 | 12/1954 | Powers | 241—46.1 |
| 2,742,237 | 4/1956 | Gruendler | 241—46.1 |
| 2,828,084 | 3/1958 | James et al. | 241—261 |
| 2,903,192 | 9/1959 | Smith et al. | 241—66 |

FOREIGN PATENTS 758,934 11/1933 France.

ROBERT C. RIORDAN, *Primary Examiner.*

D. G. KELLY, *Assistant Examiner.*

U.S. Cl. X.R.

146—192; 241—152, 188, 259, 287